(12) United States Patent
Tuineag

(10) Patent No.: US 9,835,257 B2
(45) Date of Patent: Dec. 5, 2017

(54) FLOW CONTROL VALVE

(71) Applicant: Griswold Controls, LLC, Irvine, CA (US)

(72) Inventor: Stefan I. Tuineag, Irvine, CA (US)

(73) Assignee: Griswold Controls, LLC, Irvine, CA (US)

( * ) Notice: Subject to any disclaimer, the term of this patent is extended or adjusted under 35 U.S.C. 154(b) by 40 days.

(21) Appl. No.: 15/066,332

(22) Filed: Mar. 10, 2016

(65) Prior Publication Data

US 2017/0261110 A1    Sep. 14, 2017

(51) Int. Cl.
*F16K 3/08* (2006.01)
*F16K 3/02* (2006.01)
*F16K 3/32* (2006.01)

(52) U.S. Cl.
CPC ............ *F16K 3/085* (2013.01); *F16K 3/0209* (2013.01); *F16K 3/32* (2013.01)

(58) Field of Classification Search
USPC ......................................................... 251/285
See application file for complete search history.

(56) References Cited

U.S. PATENT DOCUMENTS

| | | | | |
|---|---|---|---|---|
| 3,426,797 A * | 2/1969 | Baker | ..................... | F16K 3/085 137/625.31 |
| 3,765,645 A | 10/1973 | Paul, Jr. | | |
| 4,554,948 A * | 11/1985 | Bergmann | ............... | F16K 3/085 137/625.31 |
| 5,025,832 A | 6/1991 | Taylor | | |
| 5,402,821 A * | 4/1995 | Harstad | .................... | F16K 3/085 137/556 |
| 5,417,083 A * | 5/1995 | Eber | ....................... | F16K 3/085 251/129.11 |
| 6,273,132 B1 * | 8/2001 | Chrysler | ................. | E03B 9/025 137/360 |
| 7,114,515 B2 * | 10/2006 | Sponheimer | ............ | F16K 3/085 137/454.2 |
| 7,726,338 B2 * | 6/2010 | Clasen | .................... | F16K 3/085 137/625.31 |
| 8,398,054 B2 * | 3/2013 | Weinhold | .................. | F16K 3/08 251/205 |
| 2006/0191580 A1 | 8/2006 | Sponheimer et al. | | |
| 2009/0108224 A1 | 4/2009 | Clasen et al. | | |
| 2015/0285384 A1 | 10/2015 | Tuineag et al. | | |

OTHER PUBLICATIONS

International Search Report and Written Opinion dated Jul. 7, 2017 from International Application No. PCT/US2017/021428.

* cited by examiner

*Primary Examiner* — John Fox
(74) *Attorney, Agent, or Firm* — Crockett & Crockett, PC; K. David Crockett, Esq.

(57) ABSTRACT

A valve in which the flow control element includes a fixed disk and a rotatable disk, and a Venturi nozzle for measuring flow through the valve, arranged in a straight configuration.

16 Claims, 3 Drawing Sheets

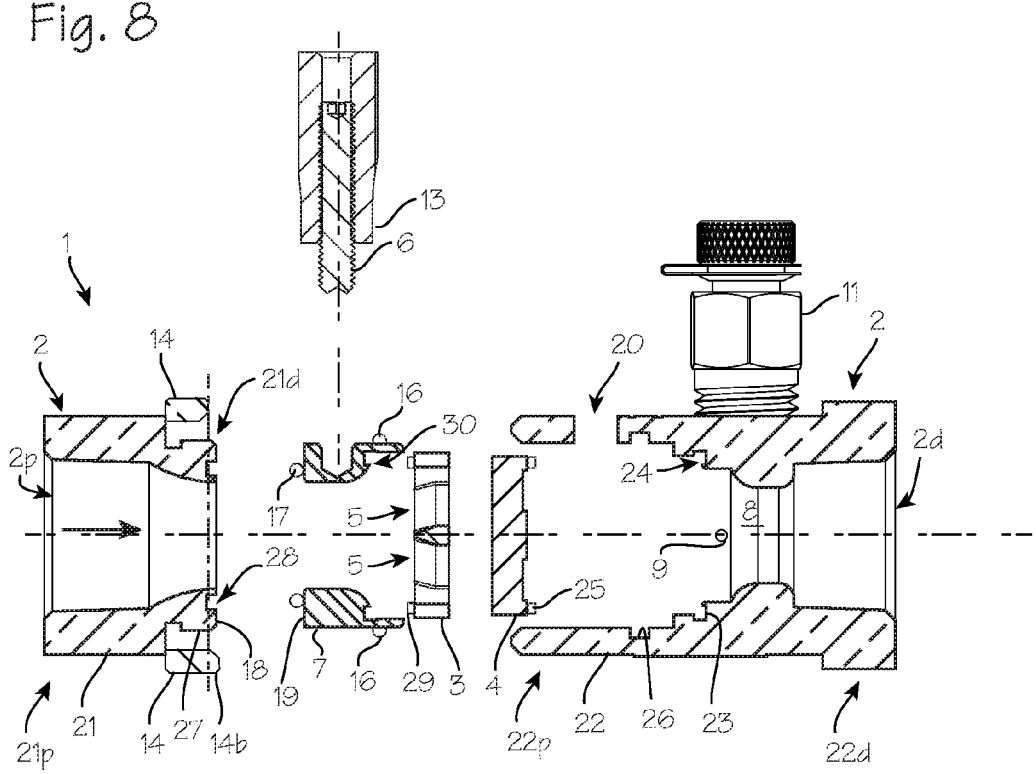

FLOW CONTROL VALVE

FIELD OF THE INVENTIONS

The inventions described below relate to the field of valves.

BACKGROUND OF THE INVENTIONS

U.S. patent application Ser. No. 14/457,120, filed Aug. 12, 2014 (U.S. Pub. 2015/0285384 (Oct. 8, 2015) discloses an axially aligned rotationally adjustable flow control valve with an integrally formed Venturi nozzle. The valve is compact and easily operated.

SUMMARY

The valve disclosed in this application is a flow control Valve which comprises a body with a substantially straight bore extending from the inlet side of the valve to the outlet side of the valve, a rotatable disk, rotatable relative to the valve body, and a fixed disk, fixed relative the valve body, and a Venturi nozzle, longitudinally spaced from the disks, with high pressure and low pressure sensing ports in fluid communication with high pressure and low pressure regions of the Venturi nozzle. The rotating disk is rotatable from the outside of the valve body, without rotation of the valve body, via a post that extends through a circumferential slot in the valve body. The valve may also most conveniently comprise two sections, including an upstream section and a downstream section, with a portion of the upstream section fitting into the downstream section, and the downstream section having an upstream opening such that the fixed disk, the rotating disk, and various O-rings, can be inserted into the downstream section and held in place by the upstream segment. The valve position may be locked in place by driving the post, or a boss of the post or a nut rotatable about the post, into contact with the valve body. A memory stop may be provided in the form of lopsided ring disposed about the valve body, rotatable about the valve body to bring a boss on the ring into contact with the post or boss.

BRIEF DESCRIPTION OF THE DRAWINGS

FIG. 8 is an exploded view of the valve, illustrating the construction of the valve.

DETAILED DESCRIPTION OF THE INVENTIONS

Figure 1:
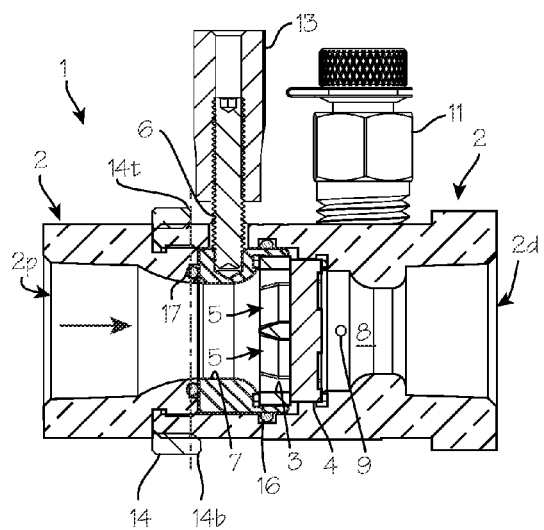
FIGS. 1 and 2 are longitudinal cross-sections of the flow control valve.
Figure 2:
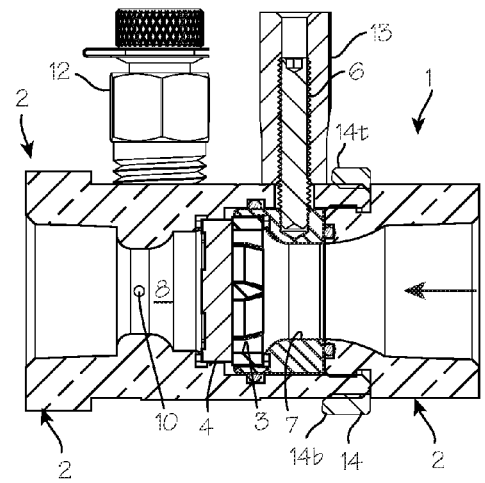

FIGS. 1 and 2 are longitudinal cross-sections of the flow control valve. The valve 1 comprises a valve body 2, characterized by an inlet and an outlet, or, synonymously, a proximal end 2p (corresponding to the inlet) and a distal end 2d (corresponding to the outlet). Two disks 3 and 4, each with apertures such as apertures 5, are disposed within the bore of the valve. Disk 3 is rotatable within the bore, and longitudinally fixed within the bore. Disk 4 is fixed, both longitudinally and rotationally, within the bore. The rotatable disk is fixed to post 6, which extends through the valve body, through a circumferential slot extending through a small portion of the circumference of the valve body, depending on the shape and extent of the apertures. In the embodiment illustrated, the slot extends about 112 degrees around the valve, so that a rotatable disk with apertures in quarter segments of the disks can be rotated 90 degrees relative to the fixed disk with apertures in quarter segments of the disk. In this configuration, the rotatable disk is indirectly fixed to the post through carrier ring 7, which is fixed to the rotatable disk 3, and this ring likewise rotatable within the bore, and longitudinally fixed within the bore. A portion 8 of the bore of the valve is configured to form a Venturi nozzle, and pressure sensing ports 9 and 10 are provided, communicating from the high pressure region of the Venturi (port 9 in FIG. 1)) and the low pressure region of the Venturi (port 10 in FIG. 2) to respective high pressure and low pressure PT testing ports 11 (FIG. 1) and 12 (FIG. 2). When installed as intended, fluid will flow through the valve, into the inlet, through the bore and disks and Venturi nozzle, and out the outlet to downstream piping. Various components are included to facilitate operation of the valve.

The post may serve as a valve lock. The post, or a portion of the post, may be radially translatable relative the carrier (that is, moveable toward and away from the carrier along a radial line) to impinge on the valve body and thereby lock the post, carrier thus the rotatable disk in a rotational position relative to the fixed disk. As illustrated, the post includes a locking nut 13 that is threaded over external threads on the post 6, and may be turned about the threaded post to impinge on the valve body. In this embodiment, though the post may be threaded into the carrier, secured such rotation of the post itself will require more force than will rotation of the locking nut. Alternatively, the post may be threaded into the carrier, and the locking nut more securely fixed to the post, such that turning the locking nut results in driving the post and locking nut radially inwardly until the locking nut impinges on the valve body. The post and nut in this instance may be integrally formed, to provide a post having a narrow portion that fits within the slot and a wider portion (a boss or a knob) disposed on the shaft just outside the valve body.

A memory stop ring 14 is disposed on the outside of the valve body, and is rotatable on the outer surface of the valve body but substantially fixed or fixable longitudinally (it may be threaded onto the outer surface of the valve body, which upon rotation would result in slight longitudinal movement which becomes fixed upon engagement with the post), so that it may be rotated to impinge on the post, or come into interfering contact with the post or component of the post and thereby provide a memory stop. The memory stop will provide a stop corresponding to the desired position of the valve, such that upon subsequent closing movement and opening movement of the post (or vice-versa), it will limit the movement of the post to the previous position in which the post impinged on the memory stop. As illustrated, the memory stop is a ring with a varying longitudinal thickness, with a thin arcuate segment 14t and a thick arcuate segment (that is, longitudinally thicker than the thin arcuate segment) which may be formed as a gradually thickening boss 14b on the side of the memory stop ring facing the post 6 and locking nut. The locking features and memory stop features shown in their various positions in FIG. 1 through 4. In FIG. 1 the locking nut is shown spaced from the valve body, such that the post may be freely rotated about the center of the valve and translated through the slot. In FIGS. 2 and 4, the post is shown after being driven into tight impinging contact with the valve body to lock the rotating disk in a desired position. In FIG. 2, the memory stop is shown with a thin arcuate segment proximate the post and its locking nut. In FIG. 4, the carrier is shown in after being rotated to bring the boss 14b proximate to and into impinging contact with the post and its locking nut.

Locking tabs 15 (see FIG. 7) are disposed on the fixed disk 4, and are sized to fit into corresponding recesses in the valve body. These locking tabs may extend radially into the valve body, or longitudinally, to fit into recesses in a shoulder of the bore. Similar locking tabs are disposed on the rotating disk 3, and are sized to fit into corresponding recesses in the carrier ring. These locking tabs may extend radially into the carrier ring, or longitudinally, to fit into recesses in a shoulder of the carrier ring. Also, O-ring 16 or other seal is disposed around the circumference of the carrier ring, and O-ring 17 or other seal is disposed between the downstream face of shoulder 18 and the upstream face 19 of the carrier ring. The O-ring 17 may be resilient and expansive, in order to apply compressive force, in a distal direction, on the rotating disk, to assist in sealing the valve when the disks are aligned such that the apertures or each are occluded by the solid portions of the other to block flow.

Figure 3:
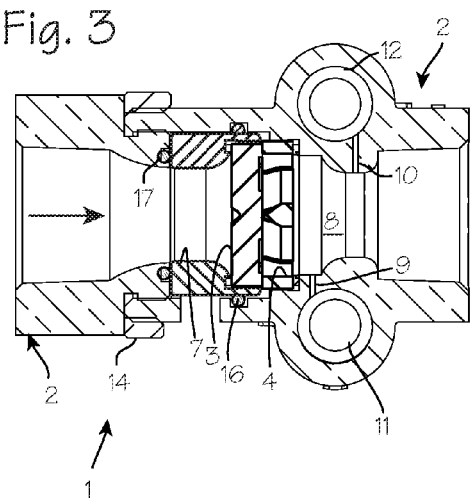
FIGS. 3 and 4 are longitudinal cross-sections of the flow control valve, showing a view orthogonal to the views of FIGS. 1 and 2.
Figure 4:
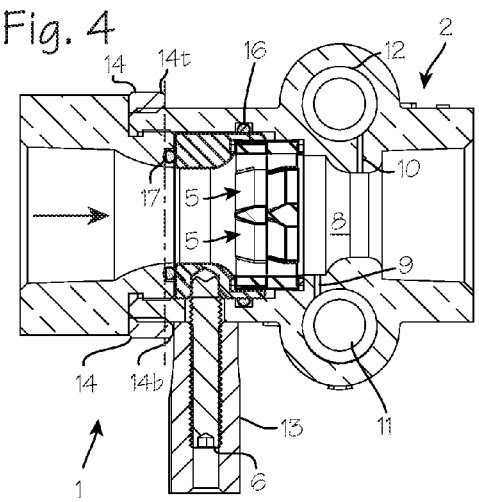

FIGS. 3 and 4 are longitudinal cross-sections of the flow control valve, showing a view orthogonal to the views of FIGS. 1 and 2. The components in these views are the same as those shown in FIGS. 1 and 2. The high pressure sensing port 9 and low pressure sensing port 10, and their fluid communications with the respective PT test ports 11 and 12 are more clearly shown. In FIG. 3, the rotatable disk and the post are shown in position corresponding to FIG. 1, in which the solid portions of the rotating disk are in occlusive relation with the apertures of the fixed disk. In FIG. 4, the rotatable disk and the post are shown rotated 90 degrees from the position of FIG. 1, with the apertures of the rotating disk aligned with the apertures of the fixed disk, so that fluid may flow through the valve.

Figure 5:
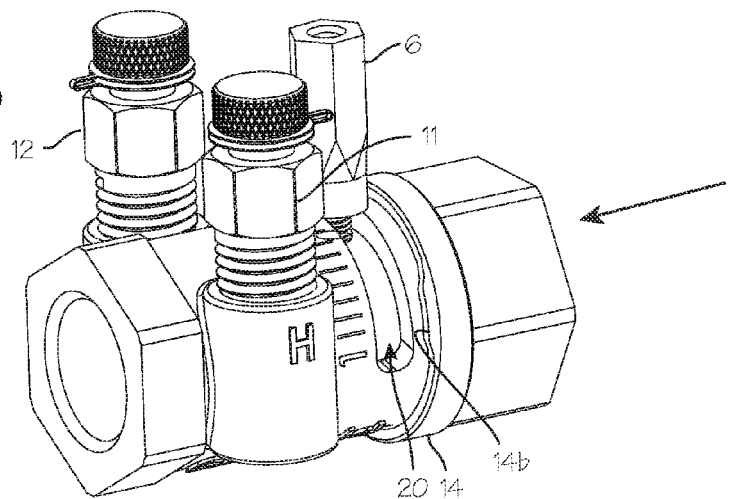
FIGS. 5 and 6 are perspective views of the valve.
Figure 6:
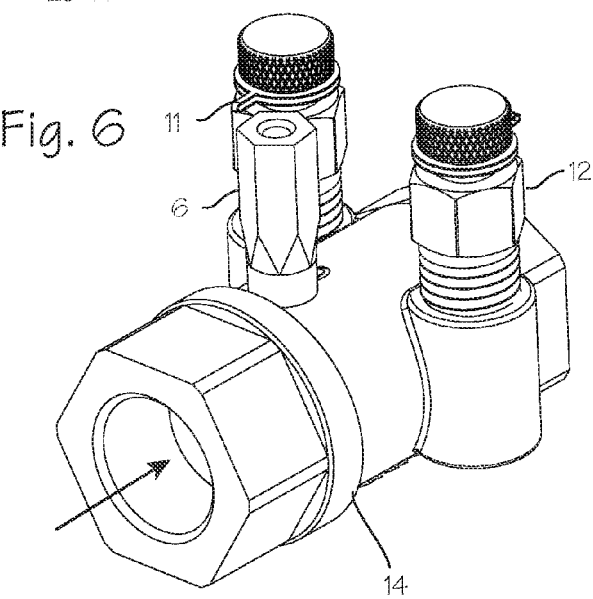

FIGS. 5 and 6 are perspective views of the valve, showing the features visible on the outside of the valve, including the circumferential slot 20 that accommodates the post 6 which is fixed to the carrier ring, the high pressure PT test port, the low pressure PT test port, and the memory stop ring 14.

Figure 7:
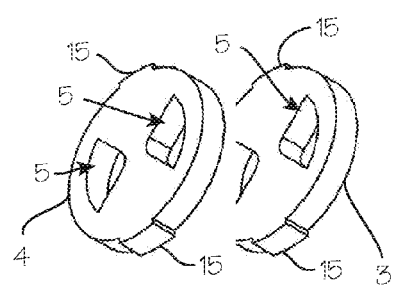
FIG. 7 illustrates the disks of the valve.

FIG. 7 illustrates the disks of the valve, showing a perspective view, showing apertures 5 of the rotating disk 3 and the fixed disk 4, and locking tabs 15 on the outer edge of the rotating disk 3 and the fixed disk 4.

FIG. 8 is an exploded view of the valve, illustrating the construction of the valve. The valve may be constructed as shown, by providing (by machining or other manufacturing technique) the inlet section 21 and outlet section 22 with the various features shown. The outlet section bore includes a distal opening 22d adapted for fixation to outlet piping, and a proximal end 22p with a bore configured to accept the fixed disk 4, the rotating disk 3, the carrier 7, and a proximal end configured to attach to the distal end of the inlet section. The features needed to accommodate these components include the proximally facing shoulder 23, sized and dimensioned to seat the fixed disk 4, and recesses 24 for receiving the rubber washer 25 of the fixed disk, O-ring groove 26 for holding an O-ring 16 around the fixed disk, the slot 20 (through the wall of the outlet section) needed for the post 6. The inlet section includes a small diameter (outer diameter) distal extension or male fitting 27 sized to fit tightly into the proximal opening or female fitting of the outlet section, with a distally facing shoulder 18 with an annular O-ring groove 28 in the shoulder. The O-ring 17 which is disposed in this groove may be configured to exert force distally on the proximal face of the carrier. Also visible in this view are a washer 29 on the rotatable disk and matching recesses 30 in the carrier. This construction of the outlet section permits easy assembly of the valve. To assemble the valve, after forming the valve body inlet and outlet sections as described, the fixed disk is inserted into the bore of the outlet section to seat the fixed disk against the proximally facing shoulder, and arranged to place the locking tabs in the recesses, thereby rotationally fixing the fixed disk to the outlet section. The rotating disk is then inserted into the proximal bore, and seated against the fixed disk. The carrier are then inserted into the bore of the outlet section, or it may combine with the rotating disk before that disk is inserted, and rotationally secured to the rotating disk. The post is then inserted through the slot and secured to the carrier. The memory stop ring, if desired, is fitted over the proximal end of the outlet section. The inlet section is then inserted onto or into the bore of the outlet section, to lock all the components in place longitudinally relative to the valve body. As illustrated, the distal end 21d has an outer diameter matching the bore size (inner diameter) of the proximal end of the outlet section, and can be inserted into the outlet section to lock the disks in place longitudinally. The inlet section may instead be provided with a large inner diameter to fit over the proximal end of the outlet section, provided that the rotatable disk or carrier is long enough relative to the bore of the outlet section such that it is impacted by the inlet section. Thus, the portion of the inlet section which is secured to the outlet section can be male or female relative to the outlet section. The inlet section and outlet section can be securely fixed to each other in any suitable manner, such as a threaded connection, compression fitting, or welding. Also, the valve body can be made with a portion of the bore of the outlet section configured as a Venturi nozzle, providing a high pressure sensing port for fluid communication between a high pressure region of the Venturi nozzle an a high pressure test port, and providing a low pressure sensing port for fluid communication between a low pressure region of the Venturi nozzle an a low pressure test port.

While the preferred embodiments of the devices and methods have been described in reference to the environment in which they were developed, they are merely illustrative of the principles of the inventions. The elements of the various embodiments may be incorporated into each of the other species to obtain the benefits of those elements in combination with such other species, and the various beneficial features may be employed in embodiments alone or in combination with each other. Other embodiments and configurations may be devised without departing from the spirit of the inventions and the scope of the appended claims.

I claim:

1. A valve comprising:
   a body characterized by a proximal end and a distal end, having an inlet section disposed at the proximal end of the body and an outlet section disposed at the distal end of the body, said inlet and outlet sections each having a substantially straight bore, with the bore of the inlet section being coaxial with the bore of the outlet section, wherein the inlet section and the outlet section are longitudinally and rotationally fixed to each other;
   a rotatable disk, rotatable relative to the valve body, rotatably disposed within the bore of the outlet section, said rotatable disk having a first aperture;
   a fixed disk, fixed relative the valve body, and disposed within the bore of the outlet section proximate to the rotatable disk, said fixed disk having a second aperture;
   a Venturi nozzle, longitudinally spaced from the disks and distal to the disks, with a high pressure sensing port in fluid communication with a high pressure region of the Venturi nozzle and low pressure sensing ports in fluid communication with a low pressure region of the Venturi nozzle;

a post, secured to rotatable disk, and extending from the disk, through a circumferential slot in the valve body, said post being slidable through the slot and operable to rotate the rotatable disk relative to the fixed disk; wherein the post is radially translatable toward the valve body, and operable to impinge upon the valve body to fix the rotating disk rotationally within the valve body; and further comprising a memory stop comprising a ring, disposed about the valve body, proximate the post, said memory stop further comprising first arcuate segment and a second arcuate segment longitudinally thicker than the first arcuate segment, said ring rotatable about the valve body to bring the second arcuate segment into interfering contact with the post.

2. The valve of claim 1, wherein the fixed disk is disposed within the bore of the outlet section distal to the rotatable disk.

3. The valve of claim 1, wherein the Venturi nozzle is disposed distal to the fixed disk.

4. The valve of claim 1, further comprising a carrier ring rotationally fixed to the rotatable disk, wherein the post is secured to the carrier ring.

5. A valve comprising:
a body characterized by a proximal end and a distal end, having an inlet section disposed at the proximal end of the body and an outlet section disposed at the distal end of the body, said inlet and outlet sections each having a substantially straight bore, with the bore of the inlet section being coaxial with the bore of the outlet section, wherein the inlet section and the outlet section are longitudinally and rotationally fixed to each other;
a rotatable disk, rotatable relative to the valve body, rotatably disposed within the bore of the outlet section, said rotatable disk having a first aperture;
a fixed disk, fixed relative the valve body, and disposed within the bore of the outlet section proximate to the rotatable disk, said fixed disk having a second aperture;
a Venturi nozzle, longitudinally spaced from the disks and distal to the disks, with a high pressure sensing port in fluid communication with a high pressure region of the Venturi nozzle and low pressure sensing ports in fluid communication with a low pressure region of the Venturi nozzle;
a post, secured to rotatable disk, and extending from the disk, through a circumferential slot in the valve body, said post being slidable through the slot and operable to rotate the rotatable disk relative to the fixed disk; wherein
the post further comprises a nut or knob disposed on the post, and wherein the nut or knob is radially translatable, on the post, toward the valve body, and operable to impinge upon the valve body to fix the rotating disk rotationally within the valve body; and further comprising
a memory stop comprising a ring, disposed about the valve body, proximate the post, said memory stop further comprising first arcuate segment and a second arcuate segment longitudinally thicker than the first arcuate segment, said ring rotatable about the valve body to bring the second arcuate segment into interfering contact with the post.

6. The valve of claim 5, wherein the fixed disk is disposed within the bore of the outlet section distal to the rotatable disk.

7. The valve of claim 5, wherein the Venturi nozzle is disposed distal to the fixed disk.

8. The valve of claim 5, further comprising a carrier ring rotationally fixed to the rotatable disk, wherein the post is secured to the carrier ring.

9. A valve comprising:
a body characterized by a proximal end and a distal end, having an inlet section disposed at the proximal end of the body and an outlet section disposed at the distal end of the body, said inlet and outlet sections each having a substantially straight bore, with the bore of the inlet section being coaxial with the bore of the outlet section, wherein the inlet section and the outlet section are longitudinally and rotationally fixed to each other;
a rotatable disk, rotatable relative to the valve body, rotatably disposed within the bore of the outlet section, said rotatable disk having a first aperture;
a fixed disk, fixed relative the valve body, and disposed within the bore of the outlet section proximate to the rotatable disk, said fixed disk having a second aperture;
a Venturi nozzle, longitudinally spaced from the disks and distal to the disks, with a high pressure sensing port in fluid communication with a high pressure region of the Venturi nozzle and low pressure sensing ports in fluid communication with a low pressure region of the Venturi nozzle;
a post, secured to rotatable disk, and extending from the disk, through a circumferential slot in the valve body, said post being slidable through the slot and operable to rotate the rotatable disk relative to the fixed disk; wherein
the post is radially translatable toward the valve body, and operable to impinge upon the valve body to fix the rotating disk rotationally within the valve body; and further comprising
a memory stop comprising a ring, disposed about the valve body, proximate the post, said memory stop further comprising boss extending longitudinally relative to the valve, said ring rotatable about the valve body to bring the boss into interfering contact with the post.

10. The valve of claim 9, wherein the fixed disk is disposed within the bore of the outlet section distal to the rotatable disk.

11. The valve of claim 9, wherein the Venturi nozzle is disposed distal to the fixed disk.

12. The valve of claim 9, further comprising a carrier ring rotationally fixed to the rotatable disk, wherein the post is secured to the carrier ring.

13. A valve comprising:
a body characterized by a proximal end and a distal end, having an inlet section disposed at the proximal end of the body and an outlet section disposed at the distal end of the body, said inlet and outlet sections each having a substantially straight bore, with the bore of the inlet section being coaxial with the bore of the outlet section, wherein the inlet section and the outlet section are longitudinally and rotationally fixed to each other;
a rotatable disk, rotatable relative to the valve body, rotatably disposed within the bore of the outlet section, said rotatable disk having a first aperture;
a fixed disk, fixed relative the valve body, and disposed within the bore of the outlet section proximate to the rotatable disk, said fixed disk having a second aperture;

a Venturi nozzle, longitudinally spaced from the disks and distal to the disks, with a high pressure sensing port in fluid communication with a high pressure region of the Venturi nozzle and low pressure sensing ports in fluid communication with a low pressure region of the Venturi nozzle;

a post, secured to rotatable disk, and extending from the disk, through a circumferential slot in the valve body, said post being slidable through the slot and operable to rotate the rotatable disk relative to the fixed disk; wherein the post further comprises a nut or knob disposed on the post, and wherein the nut or knob is radially translatable, on the post, toward the valve body, and operable to impinge upon the valve body to fix the rotating disk rotationally within the valve body; and further comprising a memory stop comprising a ring, disposed about the valve body, proximate the post, said memory stop further comprising boss extending longitudinally relative to the valve, said ring rotatable about the valve body to bring the boss into interfering contact with the post.

14. The valve of claim 13, wherein the fixed disk is disposed within the bore of the outlet section distal to the rotatable disk.

15. The valve of claim 13, wherein the Venturi nozzle is disposed distal to the fixed disk.

16. The valve of claim 13, further comprising a carrier ring rotationally fixed to the rotatable disk, wherein the post is secured to the carrier ring.

* * * * *